United States Patent [19]

Vardi

[11] Patent Number: 5,204,536
[45] Date of Patent: Apr. 20, 1993

[54] ELECTRO-OPTICAL MONITORING SYSTEM UTILIZING OPTICAL SIGNAL TRANSMITTERS IN PREDETERMINED GEOMETRICAL PATTERNS

[76] Inventor: Shlomo Vardi, 6/8 Anilevitch Street, 70400 Nes Ziona, Israel

[21] Appl. No.: 895,075

[22] Filed: Jun. 8, 1992

[30] Foreign Application Priority Data

Jun. 14, 1991 [IL] Israel .................... 98498

[51] Int. Cl.$^5$ .......................... G02B 27/00
[52] U.S. Cl. .................... 250/551; 359/155
[58] Field of Search ............ 250/551, 226, 566; 359/155, 189, 157; 340/991, 906, 988, 691

[56] References Cited

U.S. PATENT DOCUMENTS

| | | |
|---|---|---|
| 2,284,633 | 6/1942 | Bosch . |
| 2,620,470 | 12/1952 | Rather, Jr. et al. ............ 359/155 |
| 3,697,941 | 10/1972 | Christ .................... 359/155 |
| 3,718,899 | 2/1973 | Rollins ................... 340/991 |
| 3,886,515 | 5/1975 | Cottin et al. ............. 340/906 |
| 4,026,654 | 5/1977 | Beaurain ................... 356/5 |
| 4,706,086 | 11/1987 | Panizza ................... 340/902 |

FOREIGN PATENT DOCUMENTS 330165 8/1989 European Pat. Off. .
311399 12/1989 Japan .

Primary Examiner—David C. Nelms
Assistant Examiner—Que T. Le
Attorney, Agent, or Firm—Benjamin J. Barish

[57] ABSTRACT

An electro-optical monitoring system for monitoring objects, particularly vehicles, includes a plurality of optical signal transmitters carried by each monitored object (e.g. vehicle) according to predetermined geometrical patterns. An optical receiver at a remote location receives the transmitted optical signals and includes a processor which identifies the objects from the combination of the geometric pattern of transmitters thereon and the optical signals received therefrom. The transmitters may transmit differently-coded signals or signals of different wavelengths to aid in the identification of the respective object or to transmit other data.

20 Claims, 1 Drawing Sheet

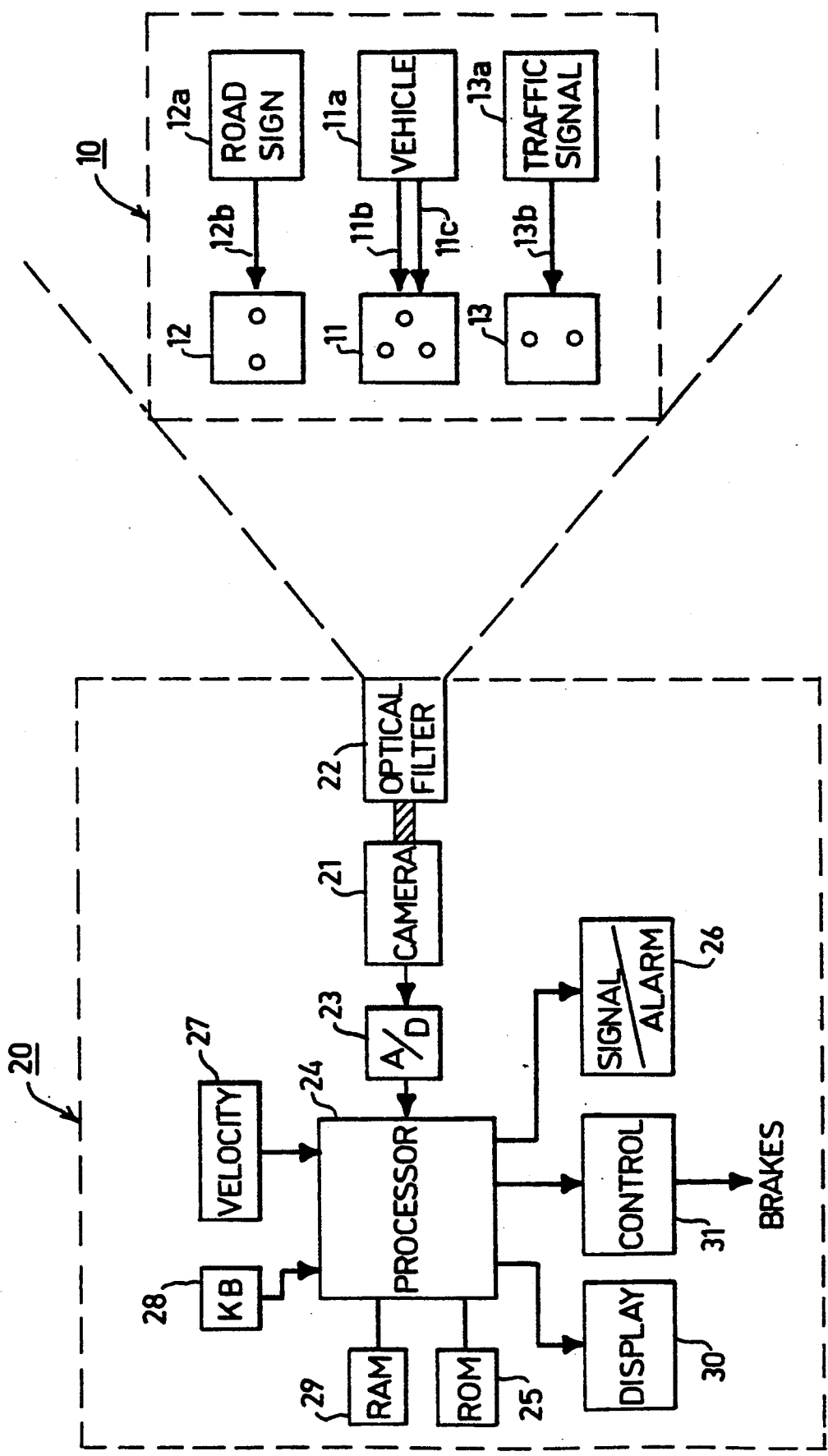

ELECTRO-OPTICAL MONITORING SYSTEM UTILIZING OPTICAL SIGNAL TRANSMITTERS IN PREDETERMINED GEOMETRICAL PATTERNS

FIELD AND BACKGROUND OF THE INVENTION

The present invention relates to an electro-optical monitoring system. The invention is particularly useful in systems for monitoring vehicles, e.g. in anti-collision systems, and in vehicle-identification systems, and is therefore described below with respect to these applications.

One important application of vehicle monitoring systems is for reducing the danger of collisions. Many of the anti-collision systems which have been devised are based on the echo-type detectors for continuously measuring the distance between two vehicles, and the rate-of-change of such distance, in order to produce a visual and/or audible signal or alarm should the distance between the two vehicles be less than a safe stopping distance predetermined for the respective velocity and rate-of-change of such distance. However, such known anti-collision systems have not proved satisfactory as evidenced by the fact that they have not been widely adopted. Moreover, such systems cannot monitor other road conditions, such as road signs, traffic lights and the like, to provide other information which may also be useful to the monitoring vehicle for increasing the safety in the operation of the monitoring vehicle.

Another important application of vehicle monitoring systems is for identifying vehicles, for example when the vehicles enter toll roads, toll bridges or the like, not only for statistical purposes, but also for determining toll charges. Previous proposals for monitoring vehicles for this purpose, such as reading the vehicle license plate number, have been relatively slow and/or unreliable.

OBJECTS AND BRIEF SUMMARY OF THE INVENTION

An object of the present invention is to provide an electro-optical monitoring system for vehicles having a number of advantages over the known systems as will be described more particularly below.

According to the present invention, there is provided an electro-optical monitoring system for monitoring objects, comprising: a plurality of optical signal transmitters carried by each monitored object according to predetermined geometrical patterns; means for actuating said transmitters on each of said objects to transmit optical signals; and an optical receiver at a remote location for receiving said transmitted optical signals, and including a processor having means for identifying the objects from the combination of the geometric pattern of transmitters thereon and the optical signals received therefrom.

According to further features, the transmitters may transmit differently-coded signals, and/or signals of different wavelengths, e.g. to identify their respective objects.

According to one preferred embodiment of the invention described below, the processor also includes means for determining the position (e.g., ,the distance, and/or the rate of change in the distance, and/or the direction) of the object with respect to the receiver. This application is particularly useful where the transmitters and receivers are in vehicles, the monitoring system being thereby effective to reduce the danger of rear-end collisions between the vehicles.

According to the described preferred embodiment, the optical signals transmitted by the transmitters on each of the vehicles may also represent further data relating to the respective vehicle, such as the status of the braking system, and/or the status of the turn indicator, of the respective vehicle. These features can be used for further reducing the danger of a rear-end or other collision.

According to still further features in the described preferred embodiment, the monitoring system may also include a further plurality of optical signal transmitters carried by fixed objects, such as traffic lights and traffic signs, in the region of the montitored vehicles according to predetermine geometrical patterns; the optical receiver at the remote location also receiving the optical signals transmitted by the further transmitters to identify the fixed object from the combination of the geometric pattern of transmitters thereon and the optical signals received therefrom.

According to further features in the described preferred embodiment, the optical signal transmitters can be, for example, laser diodes. These are particularly advantageous since they can be pulsed at high rate frequencies for purposes of identifying the respective vehicle, and also for transmitting data pertaining to the respective vehicle.

Such a system (which may be called an "electronic tag" system) enables positive identification of all the objects in a given line-of- sight, at the high speed of electronic scanning (as distinguished from radar where the scanning is mechanical), and with the ability of receiving information from all the objects also at the high speed of electronic scanning of the receiver.

An optical monitoring system constructed in accordance with the foregoing features may thus be used to provide, to a following monitoring vehicle, considerably more information useful for safe driving, and also for providing further information, such as information displayed on road signs, the condition of traffic signals, the sides of the road, a highway number, and the like. The monitoring system may also be used with respect to fixed stations, such as at the entrance of toll roads, toll bridges, or the like, for identifying the vehicles entering or leaving, to provide information useful for statistical purposes for collecting toll fees, and the like.

Further features and advantages of the invention will be apparent from the description below.

BRIEF DESCRIPTION OF THE DRAWING

The invention is herein described, by way of example only, with reference to the accompanying single drawing schematically illustrating one form of electro-optical monitoring system constructed in accordance with the invention.

DESCRIPTION OF A PREFERRED EMBODIMENT

The electro-optical monitoring system illustrated in the accompanying drawing includes a plurality of optical signal transmitters, generally designated 10, each fixable to an object to be monitored; and a receiver sub-system, generally designated 20, to be carried by the monitoring station. The accompanying drawing illustrates three examples of optical signal transmitters 11-13.

Thus, one predetermined geometrical pattern of optical signal transmitters, represented at 11, includes two or more transmitters (three being shown) at a predetermined distance between them and would be fixed to a vehicle 11a to identify it as a vehicle. In addition, the vehicle 11a would include means for varying the transmitted code signals to identify the particular vehicle and/or a particular operation of the vehicle. For example, when the vehicle is being braked, a code signal would be transmitted by the vehicle via line 11b to the optical transmitters 11, to modify (e.g., by intensity-modulation or pulse-modulation) the transmitted signals to indicate the status of the vehicle brakes; and if the turn indicator on vehicle 11a has been operated, its status would also be indicated by a code signal transmitted to its transmitter 11 via line 11c. Another example, e.g., in a toll road application, would be to have the vehicle identify itself by its code transmission.

Another type of optical signal transmitter, indicated by transmitters 12, may be fixed to road signs 12a. The object is identified as a road sign by the predetermined geometrical pattern of its optical signal transmitters, e.g., two or more transmitters spaced apart different predetermined distances and/or at a different orientation, as compared to the transmitters 11 identifying the vehicles 11a. The particular information displayed by the road sign could also be indicated in the signal transmitted by its transmitters 12. For example, if the road sign 12a signals a reduced-zone speed or a curve in the road, the respective condition would be indicated in the signal fed via line 12b to its transmitters 12 and in the signals transmitted by the transmitters.

A third geometrical pattern of optical signal transmitters is indicated by transmitters 13 fixed to a traffic signal 13a. For this purpose, the geometrical pattern includes two or more transmitters also at a predetermined distance. The coded signal transmitted by transmitters 13 would not only identify its object as being a traffic signal 13a e.g., by the particular geometric pattern of the transmitters, but would also identify the instantaneous status of the traffic signal by the code signal received therefrom via line 13b.

In all the foregoing examples, the transmitters are laser diodes, light-emitting diodes (LED's), or the like, which may be modulated in different manners, e.g., intensity-modulation, or pulse-modulation, to transmit their identification and other data of the respective object. The use of laser diodes is particularly advantageous since these may be modulated at high rate frequencies, thereby providing large amounts of information in a relatively short period of time.

The receiver sub-system, shown by block 20 in the attached drawing, is carried by the monitoring station. It includes an optical receiver 21, e.g., a video or digital camera such as a CCD (charge-coupled device) camera, with optical filter 22 of the specific wavelength of the transmitter for removing extraneous signals not transmitted by the transmitters 11-13; an analog-to-digital converter 23 for converting the analog information to digital; and a processor 24 for receiving the digital information and for processing it. Processor 24 may be a general-purpose digital microprocessor suitably programmed via its ROM (read only memory) 25 so as to scan the digital image outputted by the camera, to identify the object of the respective received signal, to process the data thereof, to determine the distance and/or velocity vector, as indicated by block 27 of the object with respect to the monitoring station, and/or to produce a visual and/or audible indication, e.g., via its signal/alarm unit 26, of the identified object and its distance with respect to the monitoring station.

Thus, the object of the received optical signal may be identified by the geometrical pattern, signal wavelength, and/or signal code (e.g., intensity or pulse-code modulation or other used code) of the respective optical signal transmitter 11-13. Processor 24 can compute the distance to the respective optical signal transmitter 11-13 by measuring the distance between the two or more light spots produced by the optical transmitters 11-13, since the number of transmitters and the distance between them is known. Processor 24 can also compute the rate-of-change of this distance by computing the distance at different times, and the direction, and can process any other information received from the transmitters.

The receiver sub-system provided on the monitoring vehicle further includes a keyboard 28 for inputting information into the processor, a RAM (random access memory) 29 for storing information during the processing operations, and a display 30 for displaying outputted information as well as for actuating the signal/alarm 26.

When the receiver 20 in the illustrated electro-optical monitoring system is installed in a vehicle, it enables the monitoring vehicle to continuously monitor the condition of the road in the line of sight in front of the monitoring vehicle. Thus, its camera 21 will continuously reproduce an optical image of what it sees in front of the monitoring vehicle, including images of the optical transmitters 11-13 in the line of sight in front of the vehicle. If a transmitter 11 attached to another vehicle 11a is seen by the camera 21, processor 24 will identify the object as being a vehicle, and will also continuously compute the distance to that vehicle on the basis of the known distance between its two or more transmitters, and will also compute the rate-of-change of that distance. When the distance between the two vehicle is determined to be less than a safe stopping distance for the relative velocity between the two vehicles, and the velocity vector (i.e. rate of change of distance and direction) indicates the possibility of a collision, processor 24 will output a visual or audible signal to unit 26 to alert the driver of this condition. The velocity vector is determinable because the receiver scans the field of view imaged by the camera.

If the object seen by camera 21 is or includes a road sign transmitter 12, this fact, as well as the type of road sign (e.g., reduced-speed zone, curve, etc.), and the information of the road sign, will be communicated to the processor 24. Similarly, if a traffic signal transmitter is seen by the camera 21, this fact, as well as the distance and condition of the traffic signal, will be communicated to the processor 24. Further, the edge of the highway may also be monitored. All this information may be used for alerting the driver or monitoring the vehicle carrying the receiver 20 for safe driving.

The receiver 20, however, may also be installed in a fixed station, such as at the entrance or exit of a toll road or toll bridge. In such an application, the system will also identify the vehicles travelling in the monitored area and may also provide other desired data with respect to such vehicles. Such data is highly useful not only for statistical purposes, but also for determining toll charges and the like.

The signals may be projected for direct reception by the receiver, and may be projected onto another surface, and their reflections received by the receiver. The use of different geometric patterns, codes, and/or wavelengths may be for identification, noise reduction, or other purposes. Other optical transmitters, e.g., infrared, ultraviolet, or visible, may be used; and also other coding means may be used for identifying each such transmitter and/or its particular status. Many other variations, modifications and applications of the invention will be apparent.

What is claimed is:

1. An electro-optical monitoring system for monitoring objects, comprising: a plurality of optical signal transmitters carried by each monitored object according to predetermined geometrical patterns; means for actuating said transmitters on each of said objects to transmit optical signals; and an optical receiver at a remote location for receiving said transmitted optical signals, and including a processor having means for identifying the objects from the combination of the geometrical pattern of transmitters thereon and the optical signals received therefrom.

2. The monitoring system according to claim 1, wherein said transmitters transmit differently-coded optical signals.

3. The monitoring system according to claim 1, wherein said transmitters transmit optical signals on different wavelengths.

4. The monitoring system according to claim 1, wherein said processor also includes means for determining the position of the object with respect to said receiver.

5. The monitoring system according to claim 1, wherein said processor also includes means for determining the distance, and/or the rate of change of the distance, of the object from said receiver.

6. The monitoring system according to claim 1, wherein said optical signals transmitted by said transmitters on each of said objects also represent further data related to the respective object.

7. The monitoring system according to claim 6, wherein at least some of said objects are vehicles, and said further data indicates the status of the braking system, and/or the status of the turn-indicator, of the respective vehicle.

8. The monitoring system according to claim 7, wherein said monitored objects also include fixed objects in the region of the monitored vehicles.

9. The monitoring system according to claim 8, wherein said fixed objects include traffic lights identified by the geometrical pattern of optical signal transmitters thereon, the transmitters of each traffic light transmitting optical signals indicating the status of the respective traffic light.

10. The monitoring system according to claim 8, wherein said fixed objects include road signs identified by the respective geometrical pattern of optical transmitters thereon, the transmitters of each road sign transmitting optical signals indicating the information displayed by the respective road sign.

11. The monitoring system according to claim 1, wherein said optical receiver is carried by a vehicle.

12. The monitoring system according to claim 1, wherein said optical receiver is carried by a fixed station in the region of the objects to be monitored.

13. An electro-optical monitoring system for monitoring vehicles, comprising: a plurality of optical signal transmitters carried by each monitored vehicle according to predetermined geometrical patterns; means for actuating said transmitters on each of said vehicles to transmit differently-coded optical signals; and an optical receiver at a remote location for receiving said transmitted optical signals, and including a processor having means for identifying the vehicles from the combination of the geometrical pattern of transmitters thereon and the optical signals received therefrom.

14. The monitoring system according to claim 13, wherein said optical signals transmitted by said transmitters on each of said vehicles also represent further data related to the respective vehicle.

15. The monitoring system according to claim 13, wherein said further data indicates the status of the braking system, and/or the status of the turn-indicator, of the respective vehicle.

16. The monitoring system according to claim 13, further including a plurality of optical signal transmitters carried by fixed objects in the region of the monitored vehicles according to predetermined geometrical patterns.

17. The monitoring system according to claim 16, wherein said fixed objects include traffic lights identified by the geometrical pattern of optical signal transmitters thereon, the transmitters of each traffic light transmitting optical signals indicating the status of the respective traffic light.

18. The monitoring system according to claim 17, wherein said fixed objects include road signs identified by the respective geometrical pattern of optical transmitters thereon, the transmitters of each road sign transmitting optical signals indicating the information displayed by the respective road sign.

19. The monitoring system according to claim 13, wherein said plurality of optical signal transmitters are laser diodes.

20. The monitoring system according to claim 13, wherein said plurality of optical signal transmitters are light-emitting diodes.

* * * * *